United States Patent
Zhang

(10) Patent No.: US 9,013,973 B2
(45) Date of Patent: Apr. 21, 2015

(54) CARRIER FREQUENCY ACQUISITION METHOD AND APPARATUS

(75) Inventor: Yun Zhang, Shanghai (CN)

(73) Assignee: Omnivision Technologies (Shanghai) Co. Ltd., Shanghai (CN)

( * ) Notice: Subject to any disclaimer, the term of this patent is extended or adjusted under 35 U.S.C. 154(b) by 70 days.

(21) Appl. No.: 13/595,744

(22) Filed: Aug. 27, 2012

(65) Prior Publication Data

US 2013/0077463 A1 Mar. 28, 2013

(30) Foreign Application Priority Data

Sep. 26, 2011 (CN) .......................... 2011 1 0288915

(51) Int. Cl.
- *H04J 11/00* (2006.01)
- *H04L 27/26* (2006.01)
- *H04L 27/00* (2006.01)

(52) U.S. Cl.
CPC ..... *H04L 27/2659* (2013.01); *H04L 2027/0026* (2013.01)

(58) Field of Classification Search
CPC .................................................. H04L 27/3405
USPC ................. 370/203; 375/260, 268, 326, 343; 714/776
See application file for complete search history.

(56) References Cited

U.S. PATENT DOCUMENTS

| | | | |
|---|---|---|---|
| 8,520,778 B2 * | 8/2013 | Sameer et al. | 375/326 |
| 2005/0163263 A1 * | 7/2005 | Gupta et al. | 375/343 |
| 2006/0031740 A1 * | 2/2006 | Kidambi et al. | 714/776 |
| 2006/0133526 A1 * | 6/2006 | Zhang et al. | 375/260 |
| 2010/0272208 A1 * | 10/2010 | Feigin et al. | 375/268 |

FOREIGN PATENT DOCUMENTS

| | | |
|---|---|---|
| CN | 1472900 A | 2/2004 |
| CN | 1964337 A | 5/2007 |
| CN | 101110602 A | 1/2008 |
| CN | 102075486 A | 5/2011 |

* cited by examiner

*Primary Examiner* — Dang Ton
*Assistant Examiner* — Lionel Preval
(74) *Attorney, Agent, or Firm* — Blakely Sokoloff Taylor & Zafman

(57) ABSTRACT

The present invention discloses a carrier frequency acquisition method and apparatus in which the structure of a transmission frame includes a short training sequence, the method including: delaying a received short training sequence by L sampling points and multiplying the delayed short training sequence with the original short training sequence to obtain a new sequence; delaying the new sequence by D sampling points and conjugate multiplying the delayed new sequence with the original new sequence; accumulating the results of the conjugate multiplication; and evaluating a phase from the result of the accumulation to estimate carrier frequency offset. With the above method, the present invention is capable of greatly improving the acquisition range of carrier frequency offset while requiring a simple set of hardware.

8 Claims, 2 Drawing Sheets

CARRIER FREQUENCY ACQUISITION METHOD AND APPARATUS

CROSS-REFERENCE TO RELATED APPLICATIONS

This application claims the priority of Chinese patent application number 201110288915.3, filed on Sep. 26, 2011, the entire contents of which are incorporated herein by reference.

TECHNICAL FIELD

The present invention relates to a carrier frequency acquisition method and apparatus, and more particularly, to a method and apparatus having a large acquisition range of carrier frequency offset.

BACKGROUND

FIG. 1 illustrates the frame structure of a multi-carrier mode in a wireless LAN, which includes a preamble sequence and data to be received. Generally, the multi-carrier mode in the wireless LAN employs the preamble sequence to achieve accurate synchronization and channel estimation. The preamble sequence includes two parts, a short training sequence and a long training sequence, wherein the short training sequence is consisted of ten duplicate short training symbols (A0, A1 . . . A9), and each short training symbol contains 16 sample points; the long training sequence includes a 32-sample CP (Cyclic Prefix) and two duplicate long training symbols (L1 and L2), each long training symbol contains 64 sample points. In general, a receiver employs the short training sequence to perform timing synchronization and carrier frequency offset acquisition, and employs the long training sequence to accurately estimate the timing position and the carrier frequency offset and to provide an accurate channel estimation.

The initial wireless LAN standard provided a bandwidth of 20 MHz for the multi-carrier mode. Then, two transmission modes were proposed to meet the requirements of application, one is "half-clocked" mode corresponding to transmission bandwidths of 10 MHz, another is "quarter-clocked" mode corresponding to transmission bandwidths of 5 MHz. It is easily found from analysis that the reduction of transmission bandwidth is accompanied with the reduction of subcarrier spacing and the increase of sampling period, as indicated by the following Table 1.

TABLE 1

| System Parameter | Transmission Mode | | |
| --- | --- | --- | --- |
| | 20 MHz | 10 MHz | 5 MHz |
| Number of FFT Point | 64 | 64 | 64 |
| Subcarrier Spacing | 312.5 KHz | 156.25 KHz | 78.125 KHz |
| Effective Bandwidth | 16.6 MHz | 8.3 MHz | 4.15 MHz |

It should be noted that the reduction of transmission bandwidth has a direct impact on the acquisition range of carrier frequency offset. Common carrier frequency offset acquisition methods can achieve the acquisition of a maximum carrier frequency offset of 625 KHz in the 20 MHz transmission mode, 312.5 KHz in the 10 MHz mode, and 156.25 KHz in the 5 MHz mode. And when a carrier frequency offset in the actual system exceeds the maximum acquisition range, the receiver can not correctly receive data.

To ensure that the data will not be affected by large carrier frequency offset during the reception phase, the carrier frequency acquisition should be accomplished during the reception of the short training sequence. Therefore, the research on dealing with carrier frequency offset within a large range by directly using the received short training sequence is of great practical significance.

SUMMARY OF THE INVENTION

In order to overcome shortcomings of the prior art, an objective of the present invention is to provide a carrier frequency acquisition method and apparatus which is capable of extremely expanding the acquisition range of carrier frequency offset with low requirement on hardware resources, and is capable of correcting carrier frequency offset over a larger range, having great significance in performing carrier recovery on system robustness.

To achieve the above objective, the present invention discloses a carrier frequency acquisition method in which the structure of a transmission frame needs to include a short training sequence, the method including following steps:

receive a transmission frame containing a short training sequence;

delay the received short training sequence by L sampling points and multiplying the delayed short training sequence with the original short training sequence to obtain a new sequence, where L=(N+½)*M; M is a length of a short training symbol of the short training sequence; N is a nonnegative integer smaller than a number of short training symbols contained in one short training sequence;

delay the new sequence by D sampling points and conjugate multiplying the delayed new sequence with the original new sequence, where D is a positive integer;

accumulate the results of the conjugate multiplication; and evaluate a phase from the result of the accumulation to estimate a carrier frequency offset.

Preferably. L is equal to M/2.

Further, the method can be applied in a multi-carrier transmission mode of wireless LANs.

Further, the results of delaying the received short training sequence by L sampling points and multiplying the delayed short training sequence with the original short training sequence are as follows:

$$\begin{cases} r_n = s_n * e^{j2\pi n f_\Delta T_s} \\ r_{n+L} = s_{n+L} * e^{j2\pi(n+L)f_\Delta T_s} \\ r_{n+L}r_n = s_{n+L}s_n * e^{j2\pi(2n+L)f_\Delta T_s} \\ r_{n+L}r_n = j|s_n|^2 * e^{j2\pi(2n+L)f_\Delta T_s} \end{cases}$$

where, $s_n$ is the short training sequence transmitted; $r_n$ is the received short training sequence; $S_{n+L}$ is $s_n$ delayed by L sampling points; $r_{n+L}$ is $r_n$ delayed by L sampling points; $T_s$ is sampling interval; $F_s$ is sampling frequency; $f_\Delta$ is the carrier frequency offset. $y_n = r_n\ _L r_n$ is the new sequence.

Further, the results of the conjugate multiplication are as follows:

$$\begin{cases} y_n = x_n * e^{j2\pi n(2f_\Delta)T_s} \\ y_{n+D} = x_{n+D} * e^{j2\pi(n+D)(2f_\Delta)T_s} \\ y_{n+D}\overline{y_n} = x_{n+D}\overline{x_n} * e^{j2\pi D(2f_\Delta)T_s} \end{cases}$$

where, $y_n$ is the new sequence; $x_n = j|s_n|^2 * e^{j2\pi L f_\Delta T_s}$.

In order to achieve the above and other objectives, the present invention also discloses a carrier frequency acquisition apparatus at least including:

a delay multiplication module for delaying a received short training sequence by L sampling points and multiplying the delayed short training sequence with the original short training sequence to obtain a new sequence, the delay multiplication module comprising a multiplier and L registers, where L=(N+½)*M; M is a length of a short training symbol of the short training sequence; and N is a non-negative integer smaller than a number of the short training symbols contained in one short training sequence;

a delay conjugate multiplication module for receiving the new sequence, delaying the new sequence by D sampling points and conjugate multiplying the delayed new sequence with the original new sequence, where D is a positive integer, the delay conjugate multiplication module comprising a multiplier and D registers;

an accumulation module connected to the delay conjugate multiplication module for accumulating outputs of the delay conjugate multiplication module, the accumulation module comprising an adder and a register; and a phase evaluation module for evaluating a phase from results of the accumulation module to estimate a carrier frequency offset, the phase evaluation module comprising a device for evaluating a phase.

Preferably. L is equal to M/2.

Further, the apparatus can be applied in a multi-carrier transmission mode of wireless LANs.

Compared with the prior art, the present invention is capable of acquiring larger carrier frequency offset directly in time domain during the reception of the short training sequence, which greatly improves the acquisition range of carrier frequency offset, and requires a simple hardware structure, only needing two multipliers, an adder, several registers and a device for evaluating a phase.

DETAILED DESCRIPTION

Figure 1:
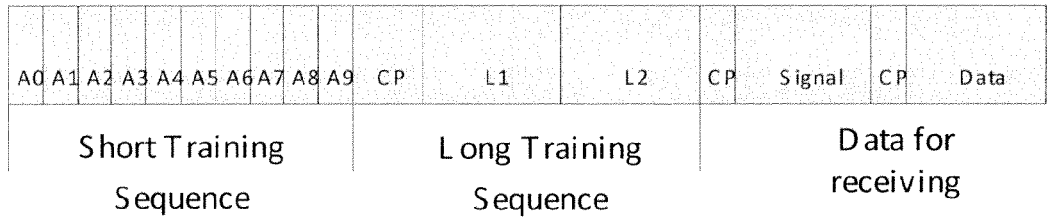
FIG. 1 illustrates the frame structure of a multi-carrier transmission mode in a wireless LAN.

The present invention will be described and specified below in combination with specific exemplary embodiments and accompanying drawings. Other advantages and effects of the present invention will be easily understood by those skilled in this art based on the disclosure in the specification. The present invention may be practiced or carried out by other embodiments, and variations and modifications may be made to details of the specification without departing from the scope of the invention.

Prior to detailed description of the present invention, a time delay conjugate correlation method, which is commonly employed by OFDM (Orthogonal Frequency Division Multiplexing) systems to estimate carrier frequency offset will be first introduced below:

In this method, if the transmitted short training sequence is marked as $s_n$, the received short training sequence is marked as $r_n$, the sampling interval is marked as $T_s$, the sampling frequency is marked as $F_s$, and the carrier frequency offset is marked as $f_\Delta$, then the received n-th sample point can be expressed as $r_n = s_n * \exp(j2\pi n f_\Delta T_s)$.

A short training sequence is composed of ten duplicate short training symbols, and each short training symbol includes 16 sampling points, wherein real parts of the first eight points are imaginary parts of the last eight points, and real parts of the last eight points are imaginary parts of the first eight points. Thus, the short training sequence totally has 160 sampling points, and are duplicated spacing 16, 32, 48, ..., and 144 sampling points. A long training sequence is composed of two long training symbols and a guard interval, and each long training symbol contains 64 sampling points. Thus, the long training sequence has a repeating cycle of 64 points. Generally, a coarse acquisition of carrier frequency offset is obtained by delaying a received short training sequence by 16 sampling points and conjugate multiplying the delayed short training sequence with the original short training sequence; and an accurate estimate of carrier frequency offset is obtained by delaying a received long training sequence by 64 sampling points and conjugate multiplying the delayed long training sequence with the original long training sequence. The maximum ranges of correct estimation of carrier frequency offset for short and long training sequences are shown in the following Table 2.

TABLE 2

| Range of carrier frequency | Transmission mode | | |
|---|---|---|---|
| offset estimation | 20 MHz | 10 MHz | 5 MHz |
| short training sequence (K = 16) | 625 KHz | 312.5 KHz | 156.25 KHz |
| long training sequence (K = 64) | 156.25 KHz | 78.125 KHz | 39.0625 KHz |

The method of estimating carrier frequency offset is to carry out time delay conjugate correlation to two duplicate sequences spaced by K sampling points in the received signals, as indicated by the follow formula (1):

$$\begin{cases} r_n = s_n * e^{j2\pi n f_\Delta T_s} \\ r_{n+K} = s_{n+K} * e^{j2\pi(n+K)f_\Delta T_s} \\ r_{n+K}\overline{r_n} = s_{n+K}\overline{s_n} * e^{j2\pi K f_\Delta T_s} \\ r_{n+K}\overline{r_n} = |s_n|^2 * e^{j2\pi K f_\Delta T_s} \\ f_\Delta = \text{angle}\left(\sum_n r_{n+K}\overline{r_n}\right) / (2\pi K T_s) \end{cases} \quad (1)$$

where, the function angle(.) is used to evaluate phase, and has a value range of $(-\pi, +\pi)$. Thus, the acquisition range of carrier frequency offset estimated by this method is $$|f_\Delta| < \frac{F_s}{2K}.$$

As the shortest cycle of the short training sequence contains 16 sampling points, i.e., K=16 for a short training sequence and the shortest cycle of the long training sequence contains 64 sampling points, i.e., K=64 for a long training sequence, the values shown in Table 2 can be obtained according to the above formula (1).

If we observe a cycle of short training sequence, and mark a complete short training symbol as $S=\{s_1, s_2, \ldots, s_{15}, s_{16}\}$, we can find a rule:

$$real(s_{k+8}) = imag(s_k)$$
$$imag(s_{k+8}) = real(s_k),$$

namely, in the 16 sampling points, real parts of the first eight points are imaginary parts of the last eight points, and real parts of the last eight points are imaginary parts of the first eight points, which can be expressed by $s_{k+8}=j*\overline{s_k}$. The present invention is just based on the above rule.

Figure 2:
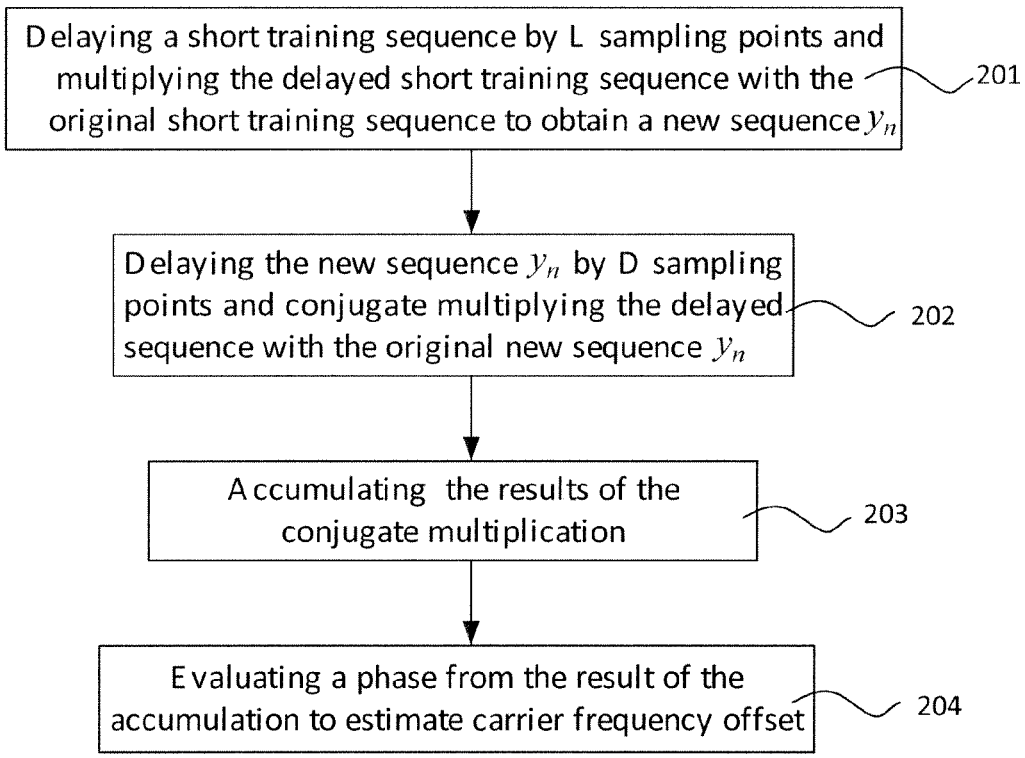
FIG. 2 is a process flow diagram illustrating the carrier frequency acquisition method of the present invention.

FIG. 2 is a process flow diagram illustrating the carrier frequency acquisition method of the present invention. The method of the present invention directly using the received short training sequence to acquire carrier frequency offset can be applied in a multi-carrier transmission mode of the wireless LANs. The method includes the following steps:

step 201: delay a short training sequence by L sampling points and then multiply the delayed short training sequence with original short training sequence to obtain a new sequence $y_n$, which contains information that twice of the actual carrier frequency offset, where L=(N+½)*M; M is the length of a short training symbol of the short training sequence; N is a nonnegative integer smaller than the number of the short training symbols contained in one short training sequence; preferably, L is M/2 in general cases.

By directly multiplying L sampling points of a short training symbol with consecutive L sampling points in a point-to-point way, we can get the following formula (2):

$$\begin{cases} r_n = s_n * e^{j2\pi n f_\Delta T_s} \\ r_{n+L} = s_{n+L} * e^{j2\pi (n+L) f_\Delta T_s} \\ r_{n+L}\overline{r_n} = s_{n+L}\overline{s_n} * e^{j2\pi(2n+L)f_\Delta T_s} \\ r_{n+L}\overline{r_n} = j|s_n|^2 * e^{j2\pi(2n+L)f_\Delta T_s} \end{cases} \quad (2)$$

The formula (2) indicates that, if a short training sequence is delayed by L=(N+½)*M sample points and then is directly multiplied with the original short training sequence, a new sequence containing information that is twice of the actual carrier frequency offset will be obtained. The obtained new sequence is marked as $y_n$, where the coefficient portion of the new sequence having an invariant phase is marked as $x_n$, we can further get the following formula (3):

$$\begin{cases} y_n = x_n * e^{j2\pi n(2f_\Delta)T_s} \\ x_n = j|s_n|^2 * e^{j2\pi L f_\Delta T_s} \end{cases} \quad (3)$$

step 202: delay the new sequence obtained in Step 201 by D sampling points and then conjugate multiply the delayed new sequence with the original new sequence to obtain the following formula (4), where D is a positive integer.

$$\begin{cases} y_n = x_n * e^{j2\pi n(2f_\Delta)T_s} \\ y_{n+D} = x_{n+D} * e^{j2\pi(n+D)(2f_\Delta)T_s} \\ y_{n+D}\overline{y_n} = x_{n+D}\overline{x_n} * e^{j2\pi D(2f_\Delta)T_s} \end{cases} \quad (4)$$

Step 203: accumulate the results of the conjugate multiplication performed in step 202.

It can be easily found from the formula (4) that, whatever the value of D is, $x_{n+D}\overline{x_n}$ will always be a real number. Therefore, the effect of noise can be reduced by accumulating $y_{n+D}\overline{y_n}$.

Step 204: evaluate a phase from the result of the accumulation to estimate the carrier frequency offset $f_\Delta$, which is expressed by the following formula (5):

$$f_\Delta = angle\left(\sum_n y_{n+D}\overline{y_n}\right) / (4\pi D T_s) \quad (5)$$

Accordingly, the acquisition range can be easily obtained as $$|f_\Delta| < \frac{F_s}{4D}.$$

Table 3 shows the maximum acquisition range of carrier frequency offset calculated based on the formula (5) when the value of the delay time D is a number within the range from 1 to 8.

TABLE 3

| | Maximum acquisition range of frequency offset | | |
|---|---|---|---|
| Value of D | 20 MHz Transmission Mode | 10 MHz Transmission Mode | 5 MHz Transmission Mode |
| D = 1 | 5 MHz | 2.5 MHz | 1.25 MHz |
| D = 2 | 2.5 MHz | 1.25 MHz | 625 KHz |
| D = 3 | 1.667 MHz | 833.4 KHz | 416.7 KHz |
| D = 4 | 1.25 MHz | 625 KHz | 312.5 KHz |
| D = 5 | 1 MHz | 500 KHz | 250 KHz |
| D = 6 | 833.2 KHz | 416.6 KHz | 208.3 KHz |
| D = 7 | 714.28 KHz | 357.14 KHz | 178.57 KHz |
| D = 8 | 625 KHz | 312.5 KHz | 156.25 KHz |

Compared with Table 2, it can be easily found that when D is equal to 8, the effect of the acquisition achieved by commonly used method in prior art is same as the method of the present invention, but the present invention can expand the maximum acquisition range of frequency offset by setting D to a smaller number.

Figure 3:
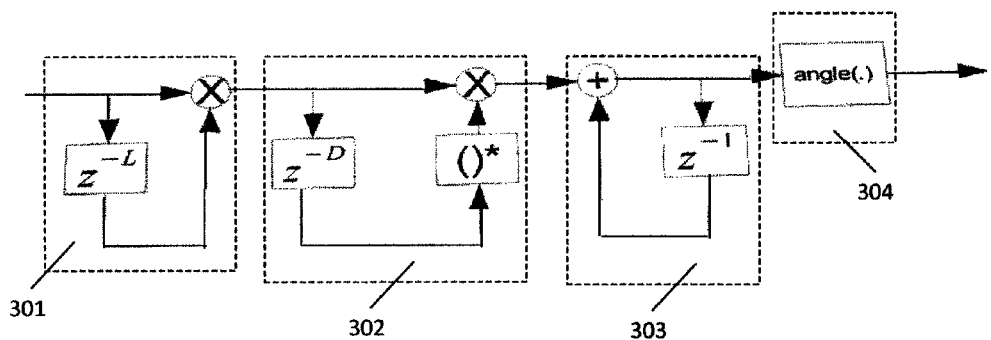
FIG. 3 is a schematic diagram of the structure of the carrier frequency acquisition apparatus of a preferred embodiment according to the present invention.

FIG. 3 is a schematic diagram of the structure of the carrier frequency acquisition apparatus according to a preferred embodiment of the present invention. The apparatus of the present invention can be applied in a multi-carrier transmission mode of the wireless LANs, and the multi-carrier transmission mode generally employs a short training sequence to acquire the carrier frequency offset. The apparatus at least includes: a delay multiplication module 301, a delay conjugate multiplication module 302, an accumulation module 303 and a phase evaluation module 304.

The delay multiplication module 301 includes a multiplier and L registers, which is used to delay a received short training sequence by L sampling points and then multiply the delayed short training sequence with the originally short training sequence to obtain a new sequence. The delay conjugate multiplication module 302 includes a multiplier and D registers, which is used to delay the new sequence by D sampling points and conjugate multiply the delayed new sequence with the original new sequence. The accumulation module 303 includes an adder, and a register, which is used to accumulate the results of the delay conjugate multiplication. The phase evaluation module 304 includes a device for evaluating a phase, which is used to evaluate the phase from the result of the accumulation to estimate the carrier frequency offset $f_\Delta$.

Figure 4:
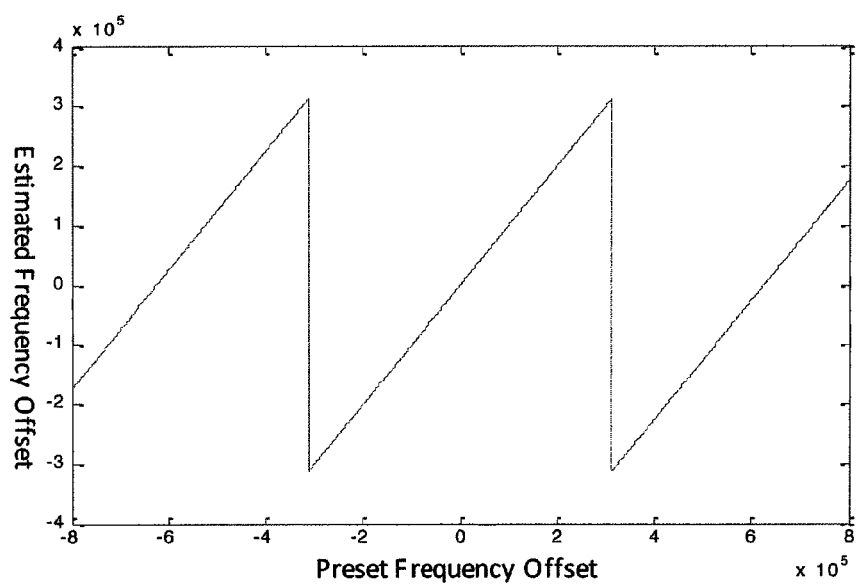
FIG. 4 is a simulation diagram illustrating the estimate result of carrier frequency offset of the present invention when the delay is 4 for 5 MHz transmission.

As an example of the present invention, for a 5 MHz transmission mode of the 802.11a system, it can be easily found from Table 2 that the estimation range of the common carrier frequency acquisition method of the prior art is ±156.25 KHz, while the estimation range of the method provided by the present invention will be doubled and expanded to ±312.5 KHz, when the value of the delayed D is set to 4. The results have been verified by simulation. FIG. 4 illustrates the estimated offset when the value of the delayed time D is set to 4 compared to the preset offset ranged from −800 KHz to +800 KHz. It can be easily found from FIG. 4 that accurate estimates can be obtained by the present invention within ±312.5 KHz. Further, a larger acquisition range can be obtained, if the delay time D is set to a smaller number, as indicated by Table 3.

Therefore, the present invention is capable of acquiring larger carrier frequency offset directly in time domain during the reception of short training sequence, which greatly improves the acquisition range of carrier frequency offset, and requires a simple hardware structure, only needing two multipliers, an adder, several registers and a device for evaluating a phase.

Numerous embodiments with great variations can be made without departing from the spirit and scope of the invention. It will be understood that specific embodiments described in the specification shall not be intended to limit the scope of the invention which shall solely be limited by the appended claims.

What is claimed is:

1. A carrier frequency acquisition method, comprising the following steps:
   receiving a transmission frame containing a short training sequence;
   delaying the received short training sequence by L sampling points and directly multiplying the delayed short training sequence with the received short training sequence to obtain a new sequence, wherein the received short training sequence comprises Q short training symbols; each of the Q short training symbols comprises M sampling points; L=(N+1/2)*M; N is a nonnegative integer smaller than Q; real parts of the first M/2 sampling points of each of the Q short training symbols are imaginary parts of the last M/2 sampling points of the symbol; and real parts of the last M/2 sampling points of each of the Q short training symbols are imaginary parts of the first M/2 sampling points of the symbol;
   delaying the new sequence by D sampling points and conjugate multiplying the delayed new sequence with the original new sequence, where D is a positive integer;

accumulating the results of the conjugate multiplication; and
evaluating a phase from the result of the accumulation to estimate a carrier frequency offset.

2. The carrier frequency acquisition method according to claim 1, wherein L is equal to M/2.

3. The carrier frequency acquisition method according to claim 1, wherein the method can be applied in a multi-carrier transmission mode of wireless LANs.

4. The carrier frequency acquisition method according to claim 1, wherein the results of delaying the received short training sequence by L sampling points and multiplying the delayed short training sequence with the received short training sequence are as follows:

$$\begin{cases} r_n = s_n * e^{j2\pi n f_\Delta T_s} \\ r_{n+L} = s_{n+L} * e^{j2\pi(n+L)f_\Delta T_s} \\ r_{n+L}r_n = s_{n+L}s_n * e^{j2\pi(2n+L)f_\Delta T_s} \\ r_{n+L}r_n = j|s_n|^2 * e^{j2\pi(2n+L)f_\Delta T_s} \end{cases}$$

where, $s_n$ is the short training sequence contained in the transmission frame; $r_n$ is the received short training sequence; $s_{n+L}$ is $s_n$ delayed by L sampling points; $r_{n+L}$ is $r_n$ delayed by L sampling points; $T_s$ is sampling interval; $F_s$ is sampling frequency; $f_\Delta$ is the carrier frequency offset; and $y_n = r_{n+L}r_n$ is the new sequence.

5. The carrier frequency acquisition method according to claim 4, wherein the results of the conjugate multiplication are as follows:

$$\begin{cases} y_n = x_n * e^{j2\pi n(2f_\Delta)T_s} \\ y_{n+D} = x_{n+D} * e^{j2\pi(n+D)(2f_\Delta)T_s} \\ y_{n+D}\overline{y_n} = x_{n+D}\overline{x_n} * e^{j2\pi D(2f_\Delta)T_s} \end{cases}$$

where, $y_n$ is the new sequence; $x_n = j|s_n|^2 * e^{j2\pi L f_\Delta T_s}$.

6. A carrier frequency acquisition apparatus, comprising:
a delay multiplication module for delaying a received short training sequence by L sampling points and directly multiplying the delayed short training sequence with the received short training sequence to obtain a new sequence, the delay multiplication module comprising a multiplier and L registers, wherein the received short training sequence comprises Q short training symbols; each of the Q short training symbols comprises M sampling points, L=(N+1/2)*M; N is a nonnegative integer smaller than Q; real parts of the first M/2 sampling points of each of the Q short training symbols are imaginary parts of the last M/2 sampling points of the symbol; real parts of the last M/2 sampling points of each of the Q short training symbols are imaginary parts of the first M/2 sampling points of the symbol;
a delay conjugate multiplication module for receiving the new sequence, delaying the new sequence by D sampling points and conjugate multiplying the delayed new sequence with the original new sequence, where D is a positive integer, the delay conjugate multiplication module comprising a multiplier and D registers;
an accumulation module connected to the delay conjugate multiplication module for accumulating outputs of the delay conjugate multiplication module, the accumulation module comprising an adder and a register; and a phase evaluation module for evaluating a phase from results of the accumulation module to estimate a carrier frequency offset, the phase evaluation module comprising a device for evaluating a phase.

7. The carrier frequency acquisition apparatus according to claim 6, wherein L is equal to M/2.

8. The carrier frequency acquisition apparatus according to claim 6, wherein the apparatus can be applied in a multi-carrier transmission mode of wireless LANs.

* * * * *